Dec. 3, 1929.  J. R. OISHEI ET AL  1,738,311
AUTOMATIC WINDSHIELD CLEANER
Filed Aug. 7, 1926
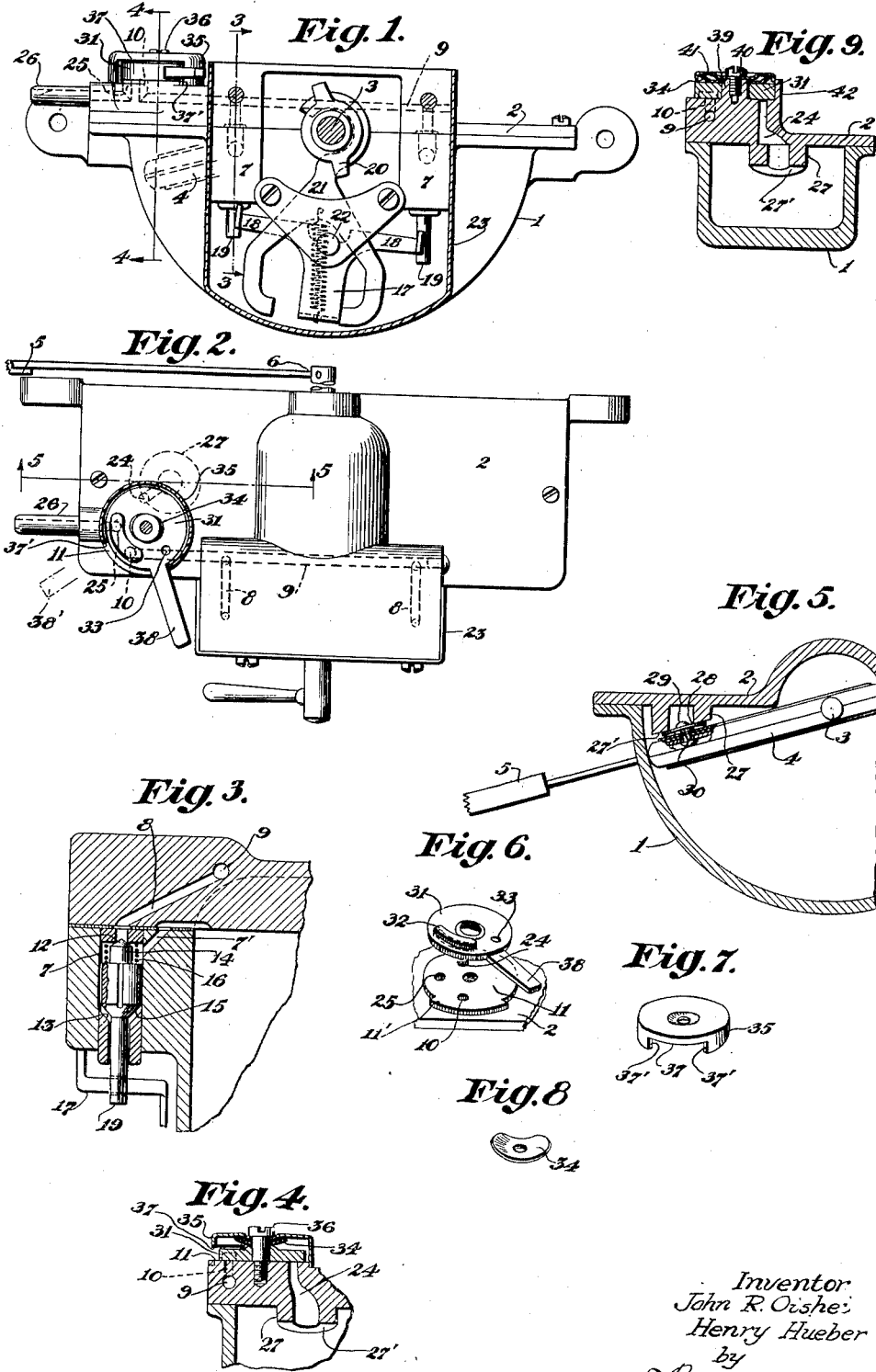
Inventor
John R. Oishei
Henry Hueber
by
Atty. Barton A. Beam Jr.

Patented Dec. 3, 1929

1,738,311

UNITED STATES PATENT OFFICE

JOHN R. OISHEI AND HENRY HUEBER, OF BUFFALO, NEW YORK, ASSIGNORS TO TRICO PRODUCTS CORPORATION, OF BUFFALO, NEW YORK

AUTOMATIC WINDSHIELD CLEANER

Application filed August 7, 1926. Serial No. 127,943.

This invention relates to automatic windshield cleaners of the fluid pressure type and more particularly to the atmospheric pressure operated or so-called suction type of windshield cleaners commonly employed on automotive vehicles.

In this type, when it is desired to discontinue the use of the windshield cleaner, it is exceedingly difficult by merely closing the control valve to bring the wiper element to rest at either limit of its oscillatory path of travel where it will be to one side of the field of vision so as to unobstruct a clear view through the windshield. Also, where the wiper element oscillates back and forth from positions adjacent the upper frame bar of the windshield, and after the windshield cleaner motor has been shut off and the wiper element manually positioned at either of its upper limits of movement so as to obtain a clear view through the windshield, there is a tendency on the part of the wiper element to creep or gravitate down into a position directly across the line of vision of the driver, which not only annoys but may confuse the driver in the proper manipulation and control of his car.

The object of the present invention is to provide a windshield cleaner which, when rendered inoperative, will automatically position or park the wiper element at one of its limits of movement and hold it thereat, said invention being an improvement on our invention disclosed and claimed in our co-pending application filed March 11, 1925 and given Serial No. 14,650.

A further object of the invention is to provide a parking valve directly on the windshield motor casing by which the source of operating pressure may be selectively connected to the fluid pressure motor of the windshield cleaner through the automatic valve mechanism, forming a part of said motor, for the normal operation of the cleaner, or directly to the interior of the piston chamber of said motor through a parking port at one side of the piston, in which latter position of the valve the source of operating pressure or suction will be continuously connected to the piston chamber at one side only of the piston whereby the latter will be drawn or moved over to its adjacent limit of movement and held thereat.

A further object is to provide the parking port within the piston chamber with an inclined or beveled seat, and the piston element with a flexible sealing valve or member directly carried by the piston and adapted to be attracted or drawn to said beveled seat and held thereon by the suction within the parking port so as to secure the piston at its adjacent limit of travel and the wiper element against creeping.

In the drawings,

Fig. 1 is a front elevation of a windshield cleaner motor embodying the present invention, the cover plate for the automatic valve mechanism being shown in section.

Fig. 2 is a top plan view of the motor with the parking valve casing shown in cross section.

Fig. 3 is a detailed sectional view on line 3—3 of Fig. 1 through the automatic valve mechanism.

Fig. 4 is a similar view through the parking valve mechanism on line 4—4 of Fig. 1.

Fig. 5 is a transverse sectional view on line 5—5 of Fig. 2 showing the parking port closed by the sealing valve which is carried by the piston.

Fig. 6 is a detailed perspective view of the parking valve elevated off its seat.

Fig. 7 is a perspective view of the cover or casing for the parking valve.

Fig. 8 is a detailed perspective view of the spring element employed to secure a resilient engagement of the parking valve on its seat.

Fig. 9 is a view similar to Fig. 4 showing a slightly modified mounting for the parking valve.

Referring more in detail to the accompanying drawing, the motor comprises a substantially semi-cylindrical casing 1 having a cover plate 2. A rock shaft 3 is journaled in complemental bearings provided in the abutting surfaces of the casing and its cover plate, and on this rock shaft is fixed a piston 4 of the vane type so that when operating pressure is alternately applied to the opposite sides of the piston the latter will rock the shaft and thereby cause an oscillatory sweep across the windshield glass of the wiper element 5, which is secured at 6 to the outer end of the rock shaft. The operative application of fluid pressure to the piston is effected by automatic valve mechanism of any desirable and satisfactory construction. In the present instance this mechanism is shown as consisting of spaced valve chambers 7 which are connected by ports 8 to a conduit 9 leading to and opening through an operating port 10 of a flat valve seat 11. In each valve chamber 7 is provided a suction valve seat 12 and an atmospheric pressure valve seat 13 with which the two valves 14 and 15 respectively cooperate in alternation, a spring 16 being disposed to normally urge the valve 15 to its seat 13. Between the valve chambers 7 is a rocker 17 having oppositely extending arms 18 each connected to the stem 19 depending from the respective valve couple 14, 15. As this rocker is operated the valve 14 of one couple will be seated while the corresponding element of the other couple will be unseated and with a reverse relation of the valves 15 obtaining with respect to their seats 13 so that while suction is acting on one side of the piston, any vacuous condition existing in the piston chamber on the opposite side of the piston will be relieved to the atmosphere whereby the piston will be driven by atmospheric air in the direction of the low pressure side. The rock shaft carries an actuator 20 having oppositely directed arms adapted to alternately engage a spring connector 21 for oscillating the latter so as to effect a quick snapping of the rocker back and forth on its pivotal mounting 22. This automatic valve mechanism may be enclosed within a removable casing 23.

The passages 8 and 9, together with the valve seat 11 are preferably provided in the cover plate 2 in which is also provided a parking or air outlet port 24 and a pressure supply or suction passage both opening through the valve seat 11. The pressure or suction supply port or passage 25 is adapted to be placed in communication with a suitable source of suction, such as the intake manifold of the motor vehicle engine, to which connection is made by a hose or pipe attached to the nipple 26. The parking port 24 has direct communication through the cover plate with the piston chamber of the casing so that when the parking port is connected to the suction supply port, the piston chamber on one side of the piston will be in constant communication with the source of suction. The parking port opens into the piston chamber through an annular boss 27 which depends from the cover plate and has its lower edges inclined or beveled on a plane substantially radially of the rock shaft 3. The piston, on its adjacent side, carries a flexible sealing disk or valve 28 which is adapted to engage the beveled seat 27' thus formed on the boss 27 and be held thereon by reason of the suction maintaining within the port 24. Since the disk 28 seals the parking port 24 to the interior of the motor casing any possibility of leakage around the piston packing and other operating parts of the motor into the adjacent portion of the piston chamber is eliminated so that the degree of suction required to hold the wiper in a parked position is reduced to a minimum. The disk 28 is fixedly secured to the piston by a rivet or other fastener 29, a spacing washer 30 of smaller diameter than the disk 28 being interposed between said disk and the face of the piston so as to space the marginal portions of the disk from the face of the piston whereby said marginal portions will readily flex or yield for effecting a firm and air-tight engagement with its seat 27'.

The parking valve comprises a disk 31 having an arcuate recess 32, adapted to connect the pressure supply port 25 with either of the ports 10 and 24, and an atmospheric port 33 which is adapted to register with the port 10 when the ports 24 and 25 are connected by the recess 32. A spring element 34, more or less dished, is superposed upon the valve disk 31 to resiliently urge a firm contact of said valve disk on its seat. A valve casing or cover 35 is arranged over the packing valve 31 and its spring 34 to enclose the same, the several cooperating parts being secured to the cover plate 2 by a pivot screw 36. The cover 35 is provided in its marginal flange or wall with a recess 37 through which the handle 38 of the parking valve projects, the vertical walls 37' of the recess 37 constituting stops to limit the throw of the handle. The valve seat 11 is slightly raised from the outer surface of the cover plate 2, and the cover 35 embracingly fits down over the seat, which latter has a radial extension 11' to interlock with the vertical walls 37' of recess 37 whereby the cover 35 is prevented from rotating about the seat.

In Fig. 9 is disclosed a slightly modified mounting for the parking valve. In this latter construction the cover 2 is cast with an up-standing boss 39 and an encircling wall 42, which latter is interrupted to provide for the proper operation of the handle 38. The valve is pivoted on the boss 39, and a screw 40 is threaded into this boss to secure the cover 41 with the underlying spring 34 and valve 31 in position, the cover 41 in this instance being devoid of a surrounding wall as in the preferred embodiment of the invention.

With the parking valve in the position shown in Figs. 1 and 2, the source of suction is connected to the motor through the automatic valve mechanism whereby the piston will be oscillated back and forth and cause the wiper element to sweep across the windshield glass. When it is desired to discontinue the use of the windshield cleaner, the handle 38 is moved to the dotted line position indicated at 38' in Fig. 2, in which position the atmospheric port 33 will register with the operating port 10 and the source of suction will be connected to the parking port 24 by the recess 32 so that the source of suction will now be directly connected to the piston chamber at one side only of the piston and shunt the automatic valve mechanism. When the parking valve is moved to the position 38' and the piston is in the position shown in Fig. 5, the suction created in the port 24 will draw the disk 28 firmly to its seat and hold the piston in such position. Should the piston be moving away from or toward the seat 27' at the time the parking valve is moved to the position 38', then the suction through port 24 will reduce the pressure in the piston chamber at that side of the piston while atmospheric pressure will enter the piston chamber on the opposite side of the piston and force the disk 28 to its seat.

In this connection it is noted that, when parking the wiper, air may enter the side of the piston chamber adjacent the parking port either past the atmosphere valve 15 or the valve 14, whichever is unseated at the time the parking valve is shifted to the parking position, but the size of the parking port with relation to the operating ports is such that the exhaust of air through said parking port will be at a faster rate than the entrance of air through the adjacent port 7', so that a reduced pressure will result in said side of the piston chamber and consequently the piston will gradually move toward the parking port 24 until the disk 28 firmly seats on the boss 27. Then the action of the suction will be directed solely upon the disk 28, acting to firmly hold the same on its seat.

By reason of the disk closing the parking port, the continuous application of suction to the piston chamber is avoided along with any injurious effect which a continued low pressure might have on the piston packing. Furthermore, because of the small area of the disk but a comparatively small degree of suction will be required to hold the piston against movement and the wiper element against creeping.

We claim:

1. A fluid pressure operated windshield cleaner comprising a casing, a shaft journaled therein, a piston fixed on the shaft and operable in the casing, a wiper rockable by the shaft, valve mechanism controlled from the shaft for operatively admitting fluid pressure to the casing on opposite sides of the piston, a valve seat formed on the casing and having one port connected to said valve mechanism and a second port communicating directly with the interior of the casing at one side of the piston, and a manual valve operable on the valve seat for selectively connecting either port with a source of operating suction.

2. A fluid pressure operated windshield cleaner comprising a wiper, a fluid pressure motor for reciprocating the wiper and including a casing having a flat valve seat, said seat having an operating port, a parking port and an operating suction supply port, and a disk valve movable on said seat and operable to connect said supply port selectively with the operating port or the parking port.

3. A fluid pressure windshield cleaner comprising a casing having a removable cover plate formed with a valve seat, a rock shaft journaled in the casing, a wiper connected to the shaft to be oscillated thereby, a vane type of piston fixed on the shaft and operating within the casing, said valve seat having a suction supply port, an operating port and a parking port, valve mechanism on the casing for connecting the operating port with the interior of the casing alternately on opposite sides of the piston, said parking port communicating through said cover plate directly with the interior of the casing at one side of the piston, and a valve pivoted on said valve seat for selectively connecting said supply port to said operating port or parking port.

4. A windshield cleaner comprising a casing having a valve seat, provided with an operating port and a parking port, a shaft journaled in the casing, a wiper operable by said shaft, a piston fixed on the shaft and operable within the casing, automatic valve mechanism operable by and during movement of the piston for connecting the operating port with the interior of the casing alternately at opposite sides of the piston, said casing having an annular valve seat arranged adjacent one limit of movement of the piston and inclined to lie substantially parallel with the adjacent face of the piston when the latter is at its said limit of movement, said parking port opening directly into the casing through said annular valve seat, a disk fixed directly on said adjacent face of the piston for engaging said annular valve seat to close said parking port therethrough, and a valve movable on said first seat for selectively connecting the parking port or operating port to a source of operating suction.

5. A windshield cleaner comprising a casing having a removable cover plate, a piston oscillatable within the casing, a shaft journaled in the casing and having the piston fixed thereon, a wiper connected to the shaft, means to operatively apply fluid pressure to the opposite sides of said piston for operating the wiper, a parking port opening through the cover plate into the casing at one side of the piston, said cover plate having a depending boss through which said parking port opens, the lower annular edge of said boss being beveled on a plane substantially radially of said shaft, a port-closing member directly carried by said piston for seating on the beveled edge of the boss to close said parking port therethrough, and a valve for selectively connecting said means or said parking port to a source of operating suction.

6. A windshield cleaner comprising a casing, a piston therein, a rock shaft journaled in the casing and having the piston fixed thereon, a wiper connected to the shaft, combined inlet and outlet ports in the casing on opposite sides of the piston, valve mechanism operable from the shaft for alternately connecting said ports to a source of suction, an air outlet port in said casing at one side of the piston spaced from said combined inlet and outlet ports, a valve seat on the casing having a parking port communicating with the air outlet port and an operating port communicating with the combined inlet and outlet ports and a third port adapted to be connected to a source of suction, a valve pivoted on said seat and having a recess adapted to connect said third seat port with either of the other seat ports, said valve having an atmospheric port adapted to register with said operating port when the third seat port is connected to the parking port, and a port-closing member carried by said piston for closing said air outlet port when the latter is connected to the source of suction.

7. A windshield cleaner comprising a casing, a piston therein, a rock shaft journaled in the casing and having the piston fixed thereon, a wiper connected to the shaft, combined inlet and outlet ports in the casing on opposite sides of the piston, valve mechanism operable from the shaft for alternately connecting said ports to a source of suction, an air outlet port in said casing at one side of the piston spaced from said combined inlet and outlet ports, a valve seat on the casing having a parking port communicating with the air outlet port and an operating port communicating with the combined inlet and outlet ports and a third port adapted to be connected to a source of suction, a valve pivoted on said seat and having a recess adapted to connect said third port with either of the other seat ports, said valve having an atmospheric port adapted to register with said operating port when the third seat port is connected to the parking port, said air outlet port permitting the exhaust of air from the casing at a faster rate than atmospheric air is permitted to enter through either of said combined inlet and outlet ports, and a disk carried by said piston for being drawn firmly over said air outlet port when the latter is connected to the source of suction.

8. In a windshield cleaner, a fluid pressure operated motor for operating a wiper, including a casing, a piston operable therein, said casing having a parking port, means for directing suction continuously through said port when the motor is inoperative, and a disk carried by the piston and having a flexible marginal portion free of the piston for being drawn over the port by the suction therein whereby the piston will be held against creeping from a parked position.

9. In a windshield cleaner, a wiper, a fluid pressure motor of the suction type for operating the wiper, including a casing, a piston, a suction passage, and automatic valve mechanism connected to the suction passage for operatively applying atmospheric pressure to the piston in alternation with the application with a lower pressure, a valve seat on the casing having an operating port communicating with said suction passage, a suction supply port for connection with a source of suction and a parking port communicating with the interior of the casing at one side of the piston, and a valve movable on the seat and having a passage for selectively connecting the suction supply port with either the parking port or the operating port, said valve also having means for restrictively opening said operating port to the atmosphere when said suction supply port is connected to said parking port.

10. In a windshield cleaner, a fluid motor comprising a casing, a piston therein, and valve mechanism for operatively applying fluid pressure to the piston, a valve seat fixed on the casing and having a parking port communicating directly with the interior of the casing at one side of the piston and an operating port communicating with the casing through the valve mechanism, a valve disk pivoted on the seat to connect the ports selectively with a source of suction, and a cover secured over the valve disk and coacting to define the movement thereof.

11. In a windshield cleaner, a fluid motor comprising a casing, a piston therein, and valve mechanism for operatively applying fluid pressure to the piston, a valve seat fixed on the casing and having a parking port communicating directly with the interior of the casing at one side of the piston and an operating port communicating with the casing through the valve mechanism, a valve disk pivoted on the seat to connect the ports selectively with a source of suction, means for limiting the movement of the valve disk, a cover secured over the valve disk, and a spring interposed between the latter and the cover to resiliently hold the valve disk on its seat.

12. A windshield cleaner comprising a casing having a suction passage, a piston in the casing, valve mechanism for alternately connecting said suction passage to the casing on opposite sides of the piston, a parking passage communicating directly with the casing at one side of the piston, and means for selectively connecting either passage to a source of suction, said means when connecting the parking passage to the source of suction providing a comparatively restricted communication between the suction passage and the atmosphere.

JOHN R. OISHEI.
HENRY HUEBER.